United States Patent
Ishikawa et al.

(10) Patent No.: US 11,296,372 B2
(45) Date of Patent: Apr. 5, 2022

(54) BATTERY MODULE AND BATTERY PACK

(71) Applicant: YAZAKI CORPORATION, Tokyo (JP)

(72) Inventors: Satoshi Ishikawa, Makinohara (JP); Takahiro Mochizuki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 117 days.

(21) Appl. No.: 16/677,600

(22) Filed: Nov. 7, 2019

(65) Prior Publication Data

US 2020/0153064 A1 May 14, 2020

(30) Foreign Application Priority Data

Nov. 9, 2018 (JP) .............................. JP2018-211058

(51) Int. Cl.
| | |
|---|---|
| *H01M 10/6568* | (2014.01) |
| *H01M 10/613* | (2014.01) |
| *H01M 50/20* | (2021.01) |
| *H01M 10/6554* | (2014.01) |
| *H01M 10/6556* | (2014.01) |
| *H01M 10/625* | (2014.01) |
| *H01M 10/6561* | (2014.01) |

(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC ........... H01M 10/6568; H01M 10/613; H01M 10/653; H01M 10/6555; H01M 10/6554;
(Continued)

(56) References Cited

U.S. PATENT DOCUMENTS

2007/0087266 A1* 4/2007 Bourke ............... H01M 50/502
429/159
2012/0141861 A1* 6/2012 Uchida ............... H01M 50/147
429/159

(Continued)

FOREIGN PATENT DOCUMENTS

| CN | 201936970 U | 8/2011 |
|---|---|---|
| CN | 103947034 A | 7/2014 |

(Continued)

OTHER PUBLICATIONS

Veejay Plastic, "What is Insert Molding? Why is it Important?", Feb. 16, 2017, Veejay Plastic Injection Molding Company, http://www.veejayplastic.com/blog/insert-molding-important/ (Year: 2017).*

(Continued)

*Primary Examiner* — Ula C Ruddock
*Assistant Examiner* — Mary Grace Byram
(74) *Attorney, Agent, or Firm* — Kenealy Vaidya LLP

(57) ABSTRACT

A battery pack includes a battery module, a case accommodating the battery module, and a cover covering the case. The battery module includes a plurality of battery cells each having an electrode at upper end, a cell accommodating portion made of resin and accommodating the plurality of battery cells, and a cooling portion for cooling the plurality of battery cells. The cooling portion includes a first metal portion disposed on a side facing a bottom end of each of the plurality of battery cells, a second metal portion extending from the other end facing surface of the first metal portion to the upper ends of the battery cells and disposed between the plurality of battery cells. The cell accommodating portion includes a resin insert portion formed by insert molding at least the other end facing surface of the first metal portion and the plurality of second metal portions.

6 Claims, 10 Drawing Sheets

(51) Int. Cl.
H01M 10/6567 (2014.01)
H01M 10/653 (2014.01)
H01M 10/6555 (2014.01)

(52) U.S. Cl.
CPC ..... H01M 10/653 (2015.04); H01M 10/6554 (2015.04); H01M 10/6555 (2015.04); H01M 10/6556 (2015.04); H01M 10/6561 (2015.04); H01M 10/6567 (2015.04); H01M 50/20 (2021.01); H01M 2220/20 (2013.01)

(58) Field of Classification Search
CPC ......... H01M 10/6556; H01M 10/6567; H01M 10/625; H01M 10/6561; H01M 50/20; H01M 2220/20
See application file for complete search history.

(56) References Cited

U.S. PATENT DOCUMENTS

| | | | |
|---|---|---|---|
| 2013/0280564 A1 | 10/2013 | Zheng et al. | |
| 2014/0315070 A1* | 10/2014 | Park | H01M 50/20 429/151 |
| 2016/0064783 A1* | 3/2016 | Chorian | H01M 10/6551 429/72 |
| 2016/0344071 A1 | 11/2016 | Zheng et al. | |
| 2018/0183119 A1 | 6/2018 | Ju et al. | |
| 2020/0350645 A1 | 11/2020 | Ju et al. | |

FOREIGN PATENT DOCUMENTS

| | | |
|---|---|---|
| CN | 203826457 U | 9/2014 |
| CN | 108242521 A | 7/2018 |
| CN | 207705268 U | 8/2018 |
| EP | 2784869 A1 | 10/2014 |
| JP | 2008-59950 A | 3/2008 |

OTHER PUBLICATIONS

Text File of Veejay Plastic, "What is Insert Molding? Why is it Important?", Feb. 16, 2017, Veejay Plastic Injection Molding Company, http://www.veejayplastic.com/blog/insert-molding-important/ (Year: 2017).*

* cited by examiner

BATTERY MODULE AND BATTERY PACK

CROSS-REFERENCE TO RELATED APPLICATIONS

This application is based on and claims priority under 35 USC 119 from Japanese Patent Application No. 2018-211058 filed on Nov. 9, 2018, the contents of which are incorporated herein by reference.

TECHNICAL FIELD

The present invention relates to a battery module including a plurality of battery cells, a cell accommodating portion made of resin, and a cooling portion made of metal. The present invention also relates to a battery pack including the battery module.

BACKGROUND ART

A battery pack mounted on an electric vehicle or a hybrid vehicle includes a battery module, a case that accommodates the battery module, and a cover that covers the case. As a battery module in the related art, a battery module disclosed in Patent Literature 1 is known, and includes a plurality of battery cells, a holder block in which each of the plurality of battery cells is accommodated in a predetermined position, and a cooling plate for cooling a plurality of the battery cells.

CITATION LIST

Patent Literature

Patent Literature 1: JP-A-2008-59950

SUMMARY OF INVENTION

In the related art described above, although the cooling plate for cooling a plurality of battery cells is included, there is a problem that the cooling effect by the cooling plate is not sufficient because the cooling plate has a structure facing only lower ends of the plurality of battery cells.

The present invention has been made in view of the above circumstances, and an object of the present invention is to provide a battery module capable of improving the cooling effect and a battery pack including the battery module.

The battery module of the present invention according to a first aspect, which has been made to solve the above problems, including a plurality of battery cells each having an electrode at one end, a cell accommodating portion made of resin and accommodating the plurality of battery cells, and a cooling portion for cooling the plurality of battery cells. The cooling portion includes a first metal portion disposed on another ends of the plurality of battery cells and having an upper surface facing the other ends of the plurality of battery cells, and a plurality of second metal portions extending from the upper surface of the first metal portion to the one ends of the plurality of battery cells and disposed between the plurality of battery cells. The cell accommodating portion includes a resin insert portion formed by insert molding at least the upper surface of the first metal portion and the plurality of second metal portions.

According to the present invention having the characteristics of the first aspect, since the other end side of the plurality of battery cells and the space between the plurality of battery cells are cooled, the cooling range can be remarkably expanded compared to the conventional example. Therefore, the cooling effect can be improved (in other words, the cooling capacity for the battery cell can be improved).

Further, according to the present invention, since the second metal portions are disposed between the plurality of battery cells, conduction between the battery cells is worried, but since a part of the resin insert portion is provided in the second metal portions by insert molding, conduction between adjacent battery cells is prevented. Therefore, according to the present invention, there is no problem in a battery cell in a case where a cell case in which a potential is generated is adopted.

The present invention according to a second aspect, in which, in the battery module according to the first aspect, the first metal portion is a metal plate, and the plurality of second metal portions are separate metal thin plates which are thinner than the first metal portion, and the first metal portion has a plurality of slits to be inserted into the plurality of second metal portions.

According to the present invention having the characteristics of the second aspect, since the first metal portion and the plurality of second metal portions are separately formed and the second metal portions are inserted into the slit of the first metal portion, the cooling portion can be easily assembled. According to the present invention, since the plurality of second metal portions are made of metal thin plates, the interval between adjacent battery cells is maintained as in the conventional example, and as a result, an increase in size can be prevented. According to the present invention, since the first metal portion is a thicker metal plate than the second metal portions, the first metal portion can have the cooling capacity even when there are a plurality of second metal portions.

The present invention according to a third aspect, in which, in the battery module according to the second aspect, the first metal portion includes a cooling passage for flowing cooling water or refrigerant.

According to the present invention having the characteristics of the third aspect, since the structure has the cooling passage, the cooling capacity of the battery cell can be improved by flowing the cooling water or the refrigerant.

The battery pack of the present invention according to a fourth aspect, which has been made to solve the above problems, includes the battery module described in the third aspect, a case that accommodates the battery module, and a cover that covers the case.

According to the present invention having the characteristics of the fourth aspect, a battery module in which the cooling effect is improved can be provided.

According to the battery module of the present invention, the cooling range can be remarkably expanded compared with the conventional example. Therefore, the cooling effect is improved. Further, according to the battery pack of the present invention, since the battery module having the above effect is included, a better pack is provided.

DESCRIPTION OF EMBODIMENTS

A battery pack includes a battery module, a case that accommodates the battery module, and a cover that covers the case. The battery module includes a plurality of battery cells each including an electrode at one end, a cell accommodating portion made of resin and accommodating the plurality of battery cells, and a cooling portion that cools the plurality of battery cells. The cooling portion includes a first metal portion disposed on another ends of the plurality of battery cells and having an upper surface facing the other ends of the plurality of battery cells, and a plurality of second metal portions extending from the upper surface of the first metal portion to the one ends of the plurality of battery cells and disposed between the plurality of battery cells. The cell accommodating portion includes a resin insert portion formed by insert molding at least the upper surface of the first metal portion and the plurality of second metal portions.

Embodiment

Figure 1:
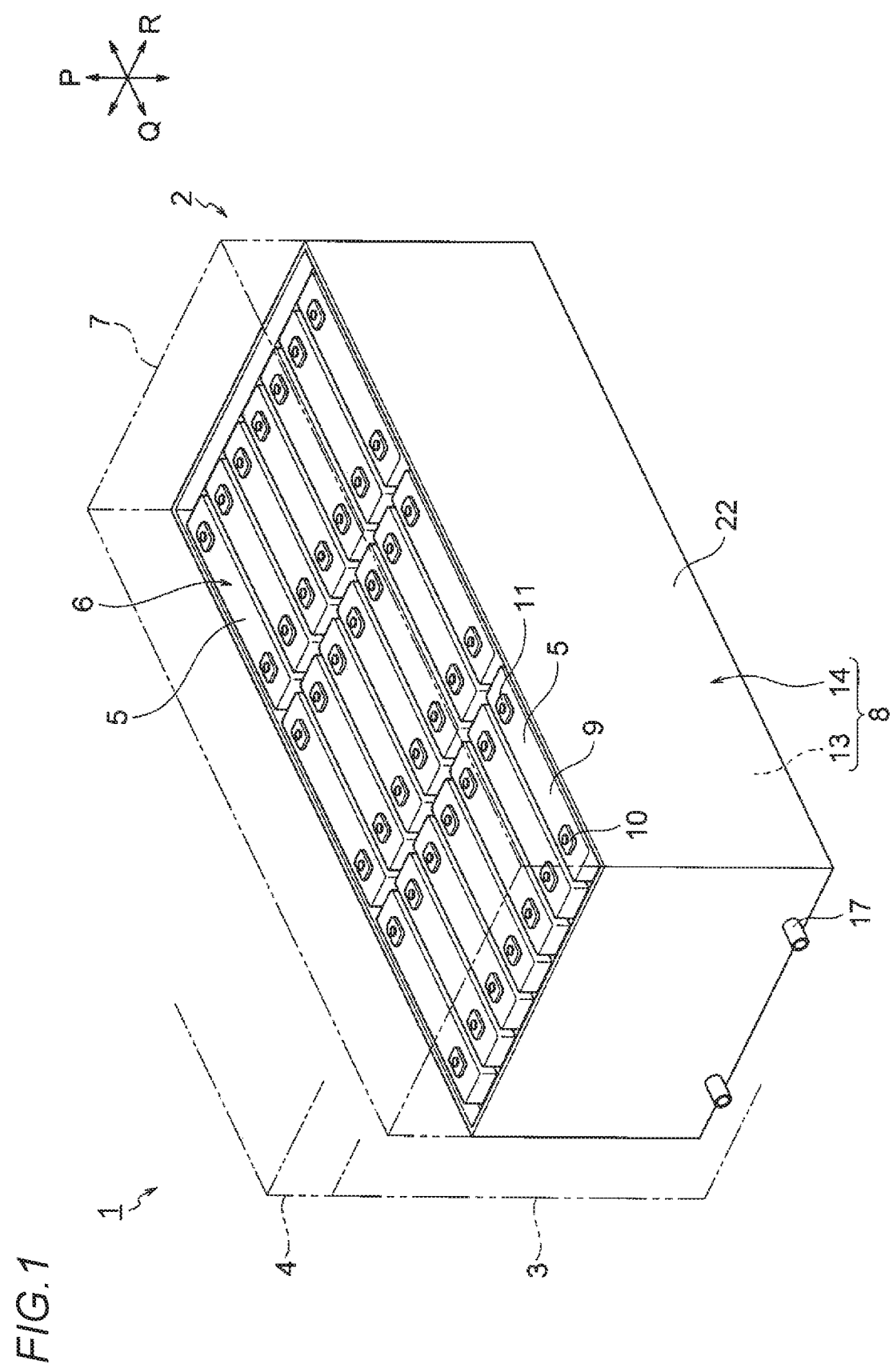
FIG. 1 is a perspective view showing an embodiment of a battery module and a battery pack of the present invention.
Figure 2:
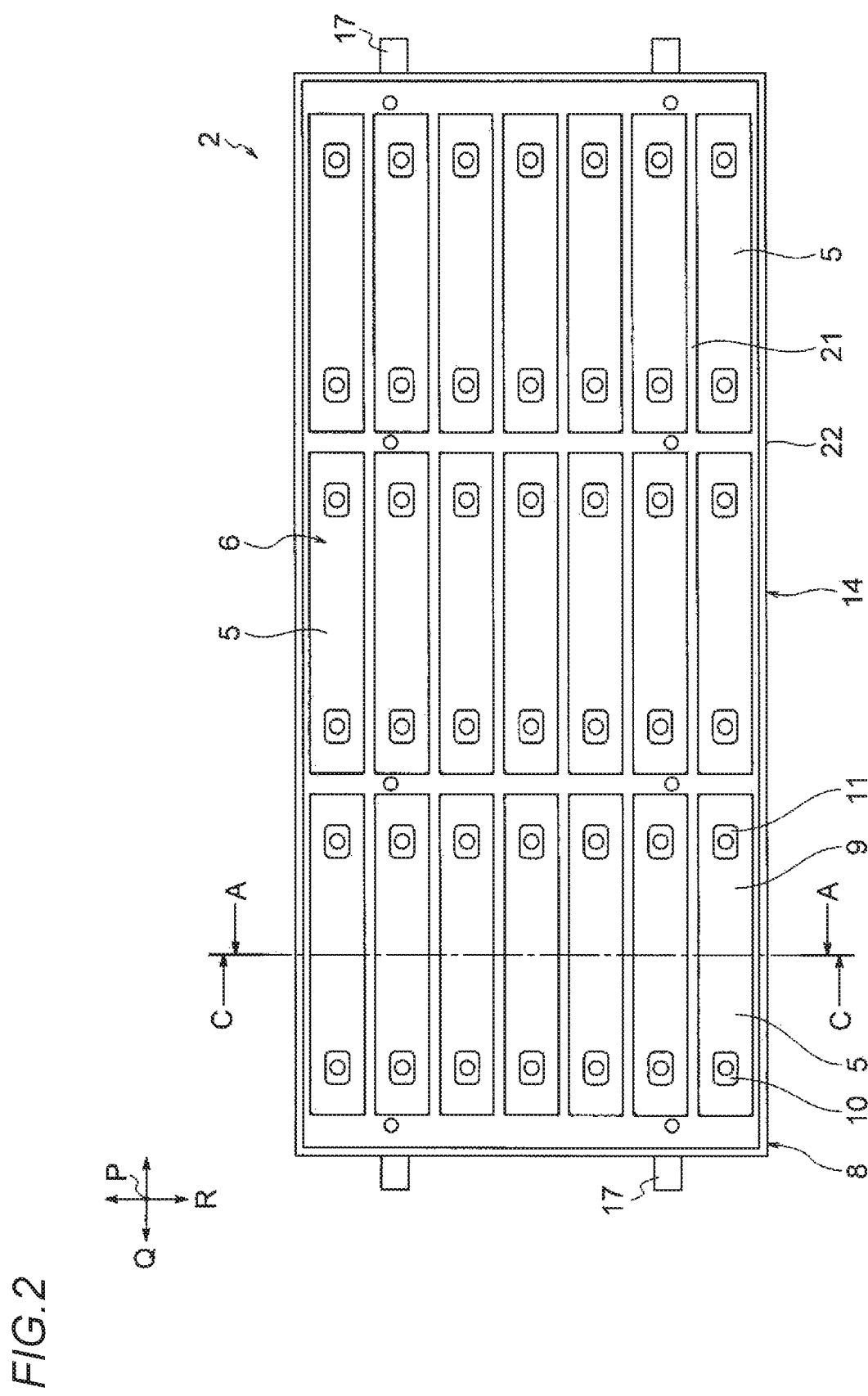
FIG. 2 is a plan view of the battery module in FIG. 1.
Figure 3:
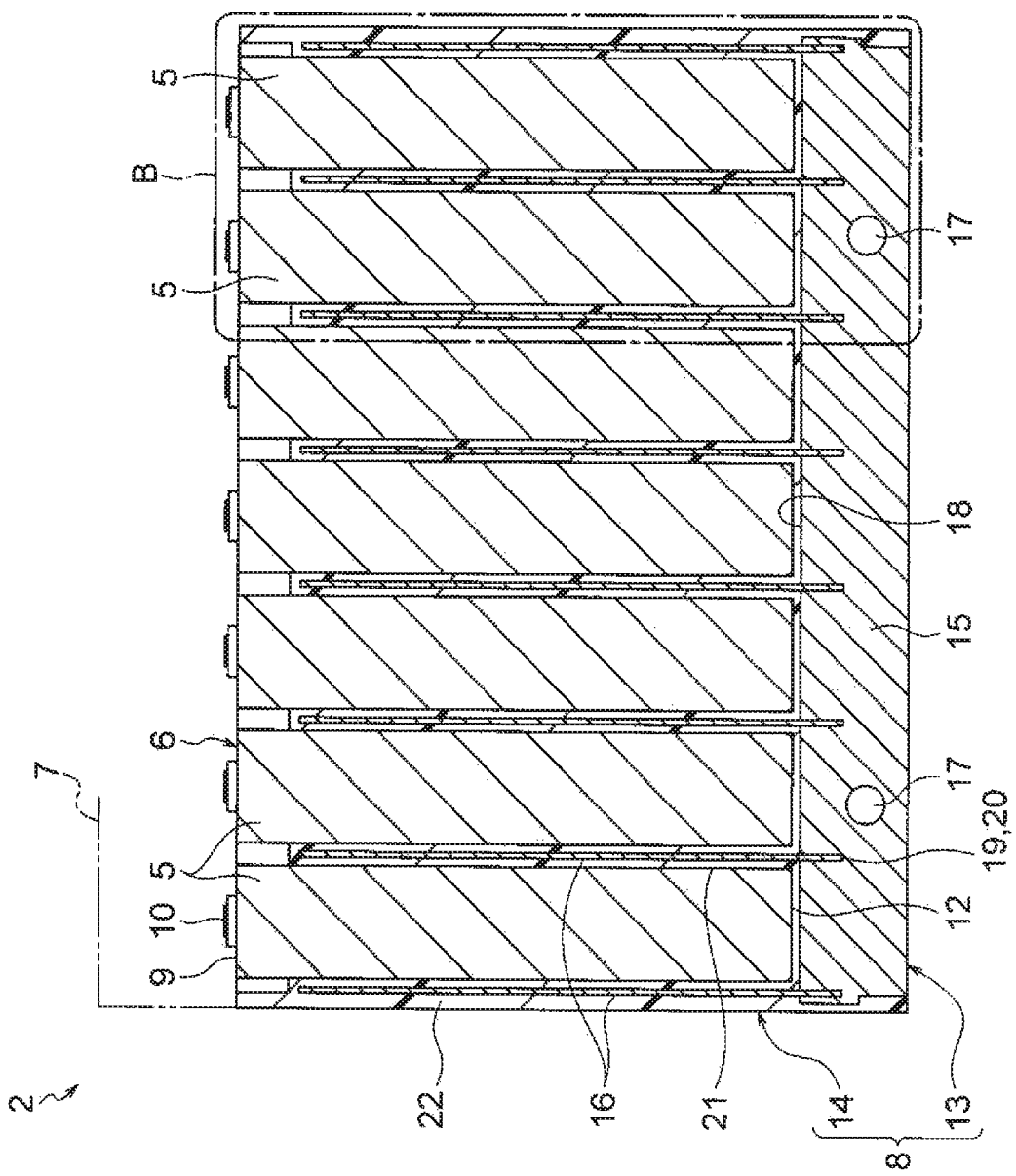
FIG. 3 is a cross-sectional view taken along line A-A in FIG. 2.
Figure 4:
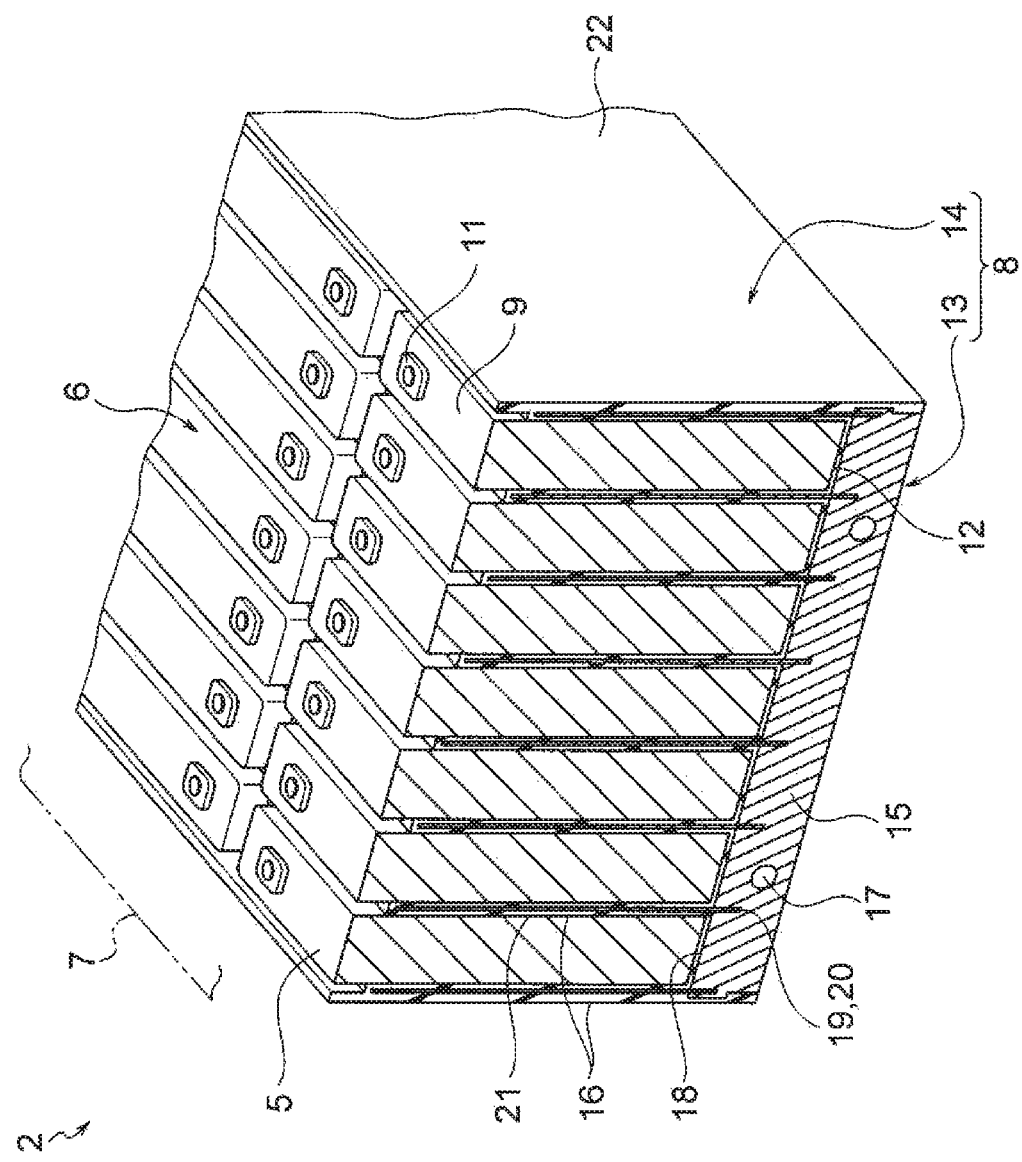
FIG. 4 is a perspective view taken along line C-C in FIG. 2.
Figure 5:
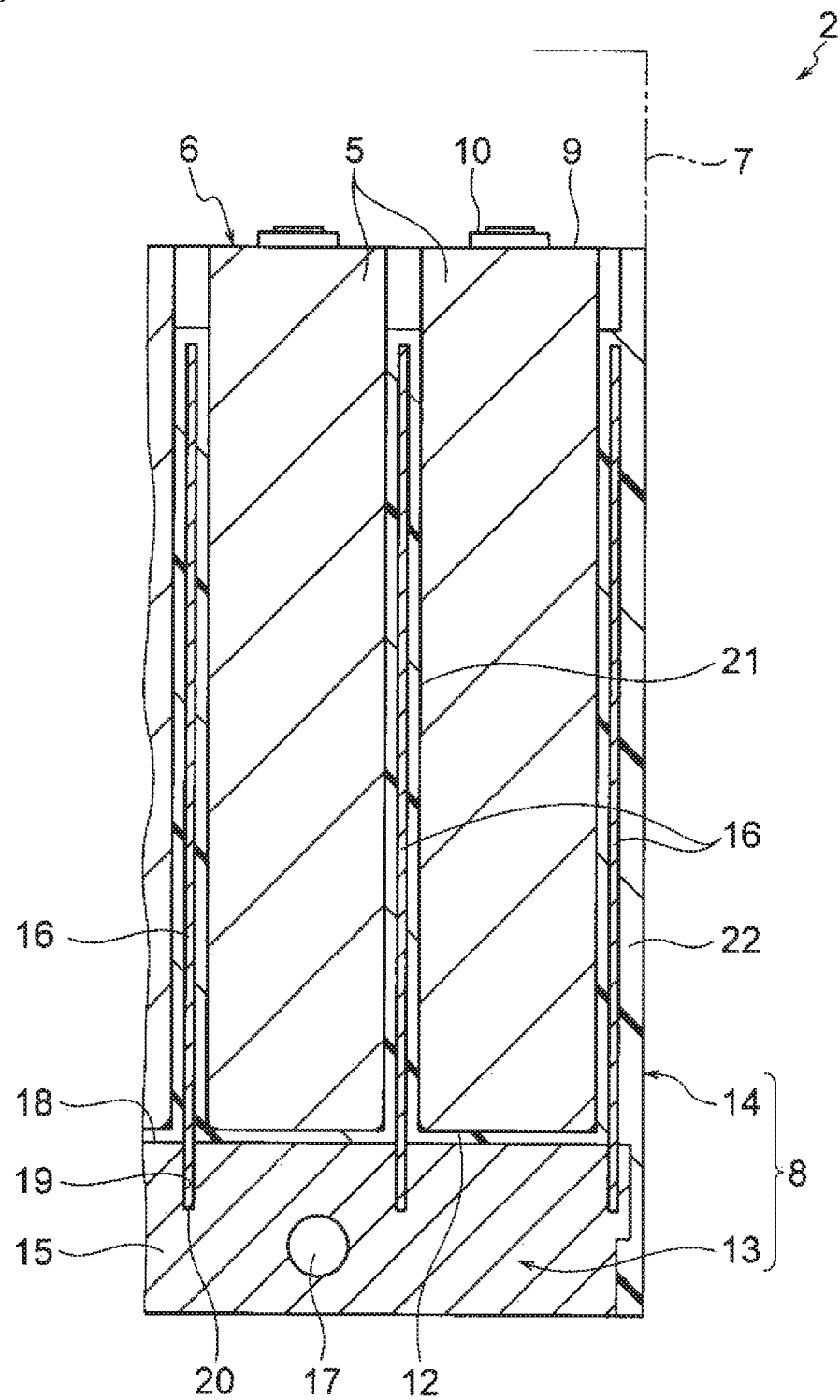
FIG. 5 is an enlarged view of a portion B in FIG. 3.
Figure 6:
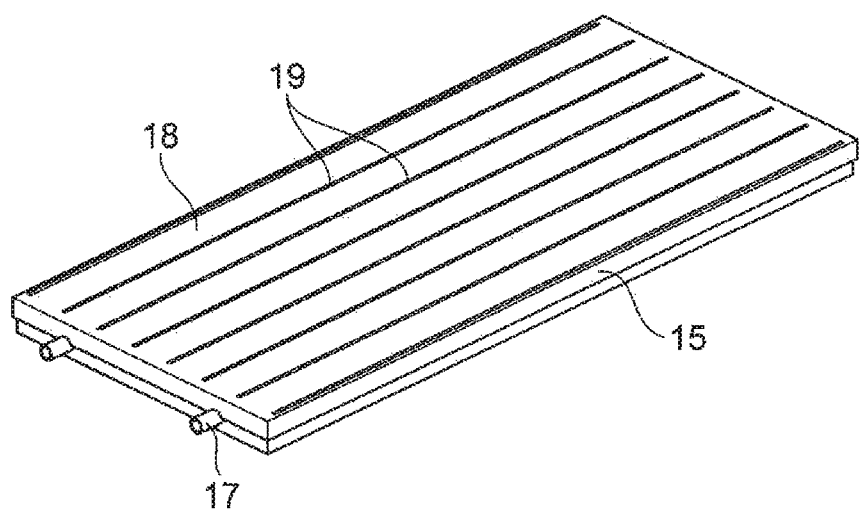
FIG. 6 is a perspective view showing a first metal portion in a cooling portion.
Figure 7:
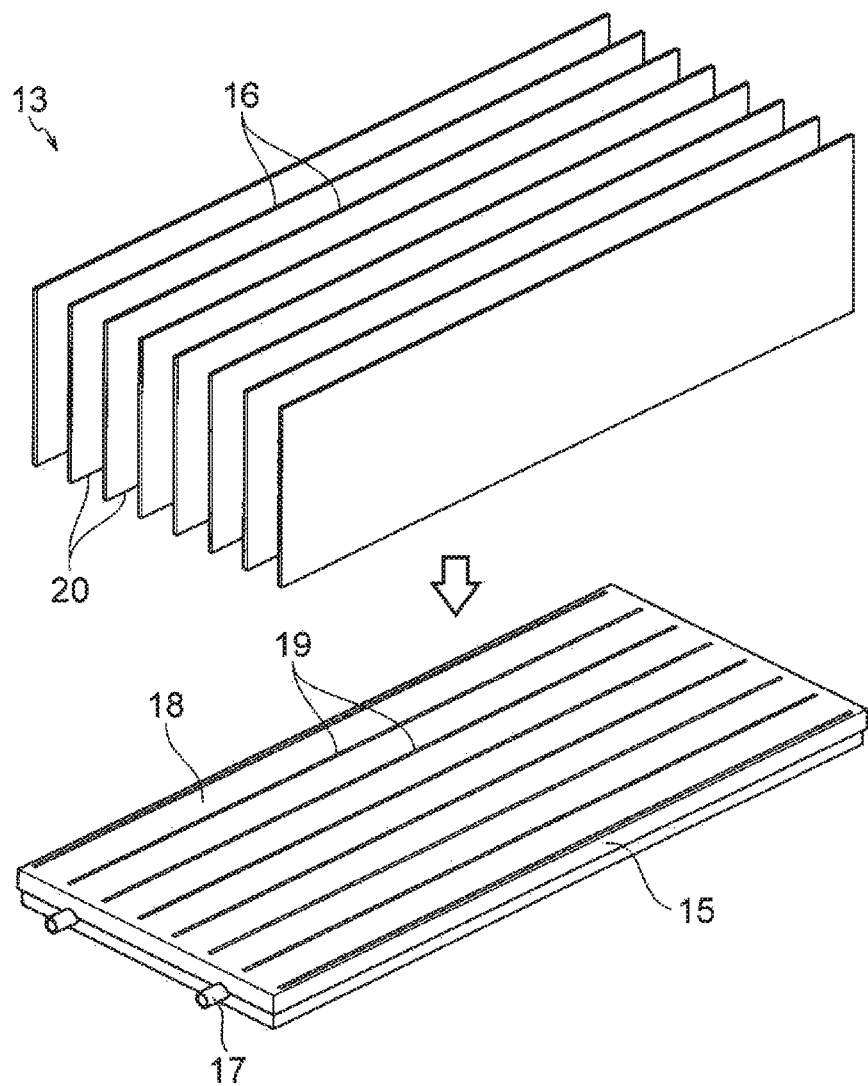
FIG. 7 is a perspective view showing a state immediately before assembly of the first metal portion and a second metal portion in the cooling portion.
Figure 8:
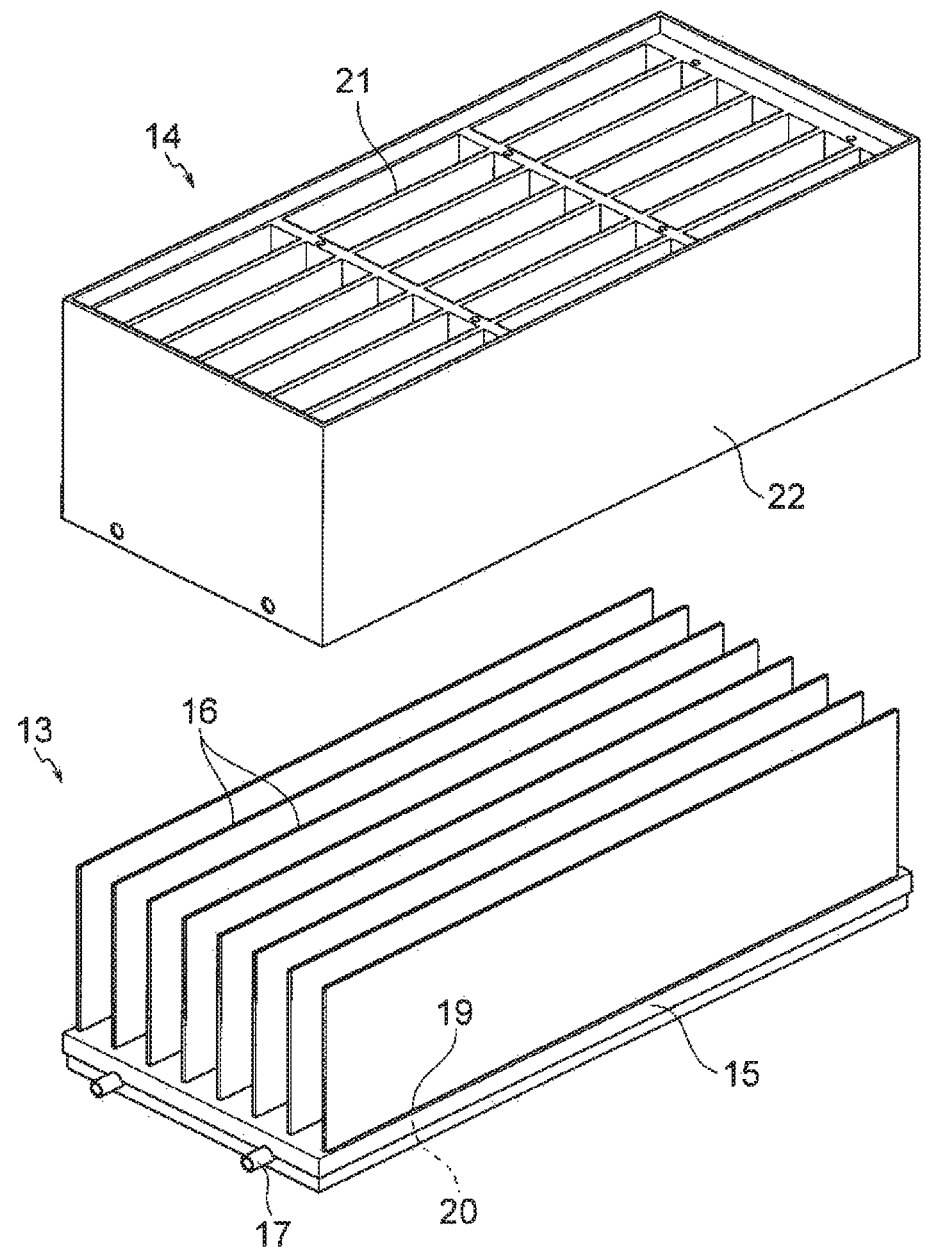
FIG. 8 is a perspective view showing a state of insert molding.
Figure 9:
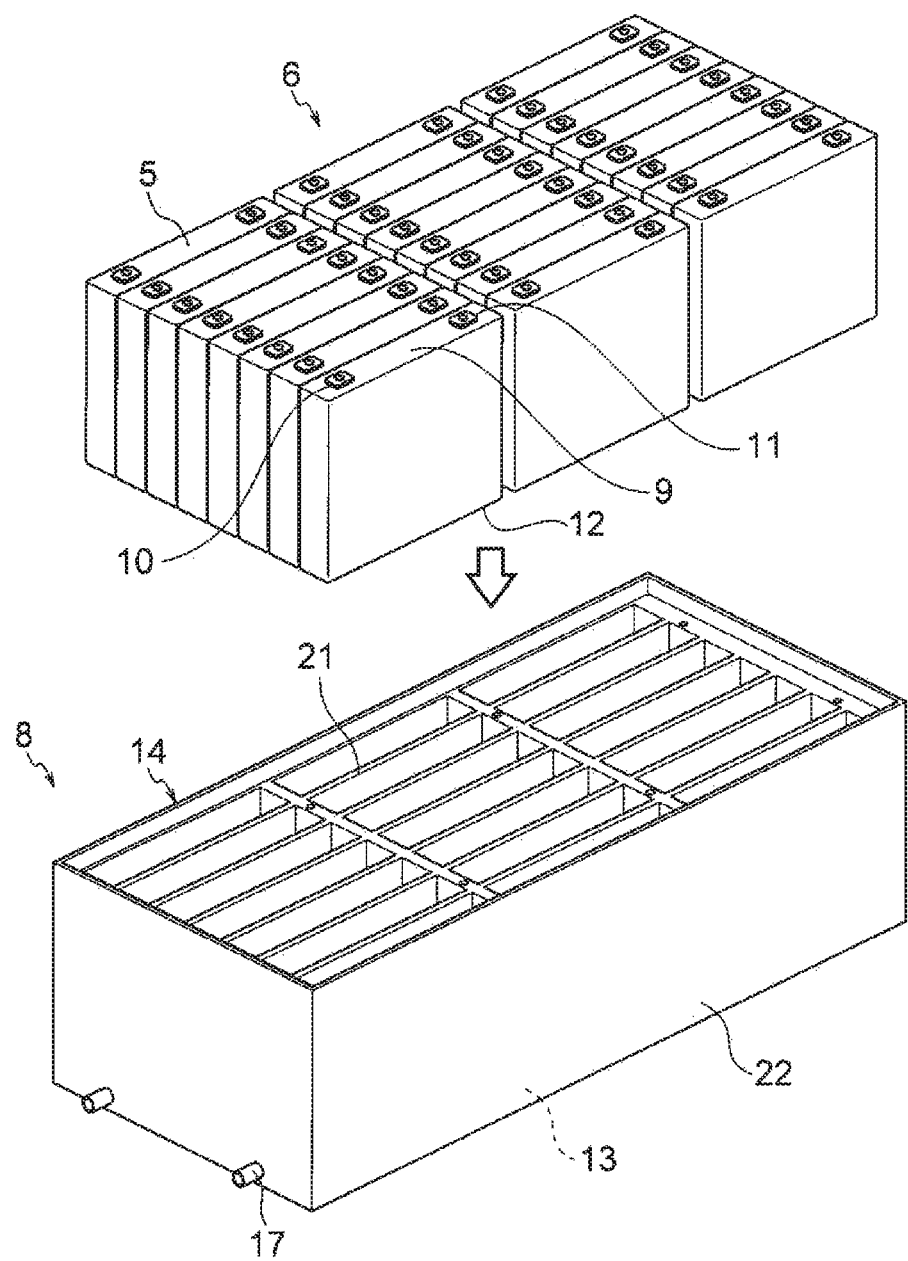
FIG. 9 is a perspective view showing a state immediately before accommodation of a battery cell.
Figure 10:
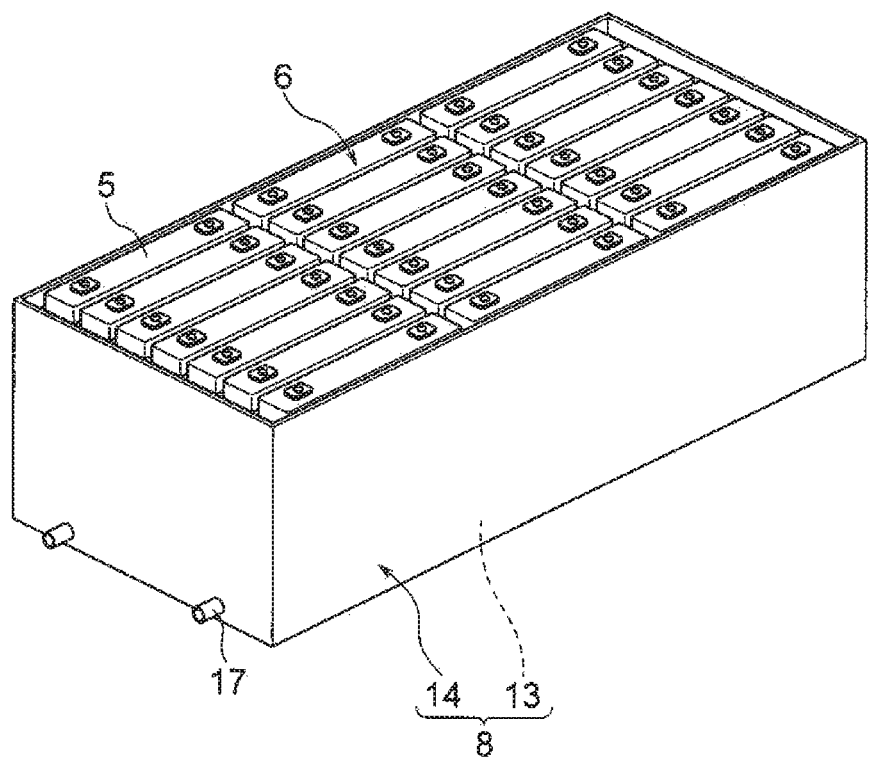
FIG. 10 is a perspective view showing a state in which battery cells are completely accommodated.

Embodiments will be described below with reference to the drawings. FIG. 1 is a perspective view showing an embodiment of a battery module and a battery pack of the present invention. Further, FIG. 2 is a plan view of the battery module in FIG. 1, FIG. 3 is a cross-sectional view taken along line A-A in FIG. 2, FIG. 4 is perspective view taken along line C-C in FIG. 2, FIG. 5 is an enlarged view of a portion B in FIG. 3, FIG. 6 is a perspective view showing a first metal portion in a cooling portion, FIG. 7 is a perspective view showing a state immediately before assembly of the first metal portion and the second metal portion in FIG. 2, FIG. 8 is a perspective view showing a state of insert molding, FIG. 9 is a perspective view showing a state immediately before accommodation of battery cells, and FIG. 10 is a perspective view showing a state in which accommodation of the battery cell is completed.

The arrow P in the drawing indicates a vertical direction (height direction). The arrow Q indicates a left-right direction. The arrow R indicates a front-rear direction.

<Battery Pack 1 and Battery Module 2>

In FIG. 1, a battery pack 1 is mounted at a predetermined position of an electric vehicle or a hybrid vehicle (not shown). Such a battery pack 1 is used as a power supply source for driving a motor. The battery pack 1 includes a battery module 2, a case 3, and a cover 4.

<Battery Module 2>

In FIG. 1, the battery module 2 includes a battery cell assembly 6 including a plurality of battery cells 5, a bus bar module 7 assembled to the battery cell assembly 6, and a cooling case 8 that accommodates and cools the battery cell assembly 6 (the plurality of battery cells 5). One or more battery modules 2 are provided as main body portions of the battery pack 1. Such a battery module 2 is provided with a connection portion to a power supply line, and the motor is driven by the electric power supplied via the power supply line.

<Battery Cell Assembly 6 and Battery Cell 5>

In FIG. 1, the battery cell assembly 6 is formed by arranging a plurality of battery cells 5 in a predetermined direction. The battery cell 5 is formed in a rectangular parallelepiped shape having a smaller width in the front-rear direction than widths in the height direction and the left-right direction. A positive electrode 10 (electrode) and a negative electrode 11 (electrode) are arranged at a predetermined interval on an upper end 9 (one end) of the battery cell 5. The positive electrode 10 and the negative electrode 11 are formed in such a shape that can be connected to a bus bar of a bus bar module 7. The adjacent battery cells 5 are disposed such that the adjacent battery cells can be connected in series by a bus bar. A lower end 12 (the other end, see FIGS. 3 and 5) of the battery cell 5 is disposed on a side facing a first metal portion 15 of a cooling portion 13, which will be described later, of a cooling case 8. As the battery cell 5 described above, a secondary battery such as a nickel metal hydride battery or a lithium ion battery is adopted.

<Bus Bar Module 7>

In FIG. 1, the bus bar module 7 includes a plurality of bus bars, a resin frame holding the plurality of bus bars, a plurality of terminals and electric wires for monitoring the voltages of the battery cells 5, a plurality of thermistors and electric wires for monitoring the temperatures of the battery cells 5, and a connection portion of the power supply line. The bus bar module 7 is formed and assembled so as to cover the entire upper end position of the battery cell assembly 6.

<Cooling Case 8>

In FIGS. 1 to 5, the cooling case 8 includes a metal cooling portion 13 for cooling the battery cell assembly 6 (the plurality of battery cells 5), and a cell accommodating portion 14 made of resin for accommodating the battery cell assembly 6 (the plurality of battery cells 5). The cooling case 8 is formed by integrating a cooling part 13 made of metal and a cell accommodating portion 14 made of resin by insert molding technology in resin molding (having a separate structure as an example).

<Cooling Portion 13>

In FIGS. 3 to 5, the cooling portion 13 is a metal member for cooling the battery cell assembly 6 (the plurality of battery cells 5) as described above, and includes a first metal portion 15, a plurality of second metal portions 16, and two cooling passages 17. The cooling portion 13 in the present embodiment is adopted a cooling method using water, but may be adopted a cooling method using a liquid or a gaseous refrigerant, or a cooling method using air.

<First Metal Portion 15>

In FIGS. 3 to 7, the first metal portion 15 is a relatively thick plate-like member, and is formed in a rectangular shape in a plan view according to the shape of the battery cell assembly 6. The first metal portion 15 is disposed on a side facing the lower end (the lower ends 12 (the other ends) of the plurality of battery cells 5) of the battery cell assembly 6. The first metal portion 15 is formed such that four side portions, which are side portions in the left-right direction and side portions in the front-rear direction, have stepped shapes, respectively. This stepped shape is formed in a portion effective for preventing detachment in the integration with the cell accommodating portion 14 made of resin. The lower surface of the first metal portion 15 is formed on a flat surface without unevenness. The upper surface of the first metal portion 15 is formed as the other end facing surface 18 since the upper surface of the first metal portion 15 faces the lower end (the lower ends 12 (the other ends) of the plurality of battery cells 5) of the battery cell assembly 6. A plurality of slits 19 are formed in the other end facing surface 18.

<A Plurality of Slits 19>

In FIGS. 6 and 7, the plurality of slits 19 are formed in a groove-like (concave) insertion portion extending straight in the left-right direction. The plurality of slits 19 are formed in a portion where the plurality of second metal portions 16 are inserted. Eight slits 19 are formed in the present embodiment. The plurality of slits 19 are formed such that the plurality of second metal portions 16 are inserted in a predetermined direction without rattling. The plurality of slits 19 are formed in a portion for connecting the plurality of second metal portions 16 to the first metal portion 15.

<A Plurality of Second Metal Portions 16>

In FIGS. 3, 4, 5, and 7, the plurality of second metal portions 16 are formed in separate metal thin plates which are thinner than the first metal portion 15. In the present embodiment, eight second metal portions 16 are provided in total, including six disposed between the battery cells 5 and two disposed at positions of side walls 22, which will be described later, of the cell accommodating portion 14. The second metal portions 16 are provided according to the number and arrangement of the battery cells 5. In the present embodiment, the plurality of second metal portions 16 are formed to have thicknesses so that the intervals between the battery cells 5 can be kept optimal. The plurality of second metal portions 16 are formed in rectangular thin plate shapes so as to extend straight toward the upper end (the upper ends 9 (one ends) of the plurality of battery cells 5) of the battery cell assembly 6 and extend straight in the left-right direction. Fixing portions 20 to be inserted into the plurality of slits 19 are formed at the lower ends of the plurality of second metal portions 16. In the present embodiment, the upper ends of the plurality of second metal portions 16 are disposed at positions slightly lower than the upper ends (the upper ends 9 (one ends) of the plurality of battery cells 5) of the battery cell assembly 6. The sizes of the plurality of second metal portions 16 are set according to the heat generation positions of the battery cells 5.

<Cooling Passage 17>

In FIGS. 1 to 7, two cooling passages 17 are formed on the left and right side portions of the first metal portion 15. The cooling passage 17 is formed in a shape that serves as a passage for flowing cooling water (or a refrigerant) (not shown). The cooling passage 17 is formed straight in the left-right direction so as to pass through the first metal portion 15. The cooling passage 17 may be formed by inserting a metal pipe into the first metal portion 15. The number of cooling passages 17 is an example.

<Cell Accommodating Portion 14>

In FIGS. 1 to 5, a cell accommodating portion 14 is a resin molded portion for accommodating the battery cell assembly 6 (the plurality of battery cells 5) as described above, and is formed to have a shape illustrated with a resin insert portion 21 and a side wall 22. The cell accommodating portion 14 is formed in a rectangular box shape in a plan view according to the shape of the battery cell assembly 6. In this molding, a resin material (high thermal conductivity resin) having insulating properties and having a high thermal conductivity is used for the cell accommodating portion 14.

<Resin Insert Portion 21 and Side Wall 22>

In FIGS. 3 to 5, the resin insert portion 21 is formed in such a portion that the other end facing surface 18 of the first metal portion 15 and the plurality of second metal portions 16 (six disposed between the battery cells 5) are insert-molded. The resin insert portion 21 is formed in a thin wall portion. The resin insert portion 21 is formed in a portion serving as a separator. The side wall 22 is formed in a portion formed by insert molding a plurality of second metal portions 16 (remaining two of the eight metal portions) and four side portions of the first metal portion 15. The side wall 22 is formed in a wall portion thicker than the resin insert portion 21. The side wall 22 is formed so as to protrude the cooling passage 17.

<Formation of Cooling Case 8 and Assembly of Battery Cell Assembly 6>

In the above configuration and structure, the cooling case 8 is formed by being assembled as follows. That is, while the first metal portion 15 including two cooling passages 17 and eight slits 19 is prepared as shown in FIG. 6, eight second metal portions 16 are prepared, and the cooling portion 13 is formed when the two second metal portions 16 are assembled as shown in FIG. 7. When insert molding is performed on the cooling portion 13 such that the cell accommodating portion 14 has a shape as shown in FIG. 8, the cooling case 8 is formed (see FIG. 9). Then, when the battery cell assembly 6 is prepared and accommodated in the cooling case 8, the assembly of the cooling case 8 and the battery cell assembly 6 is completed as shown in FIG. 10.

<Effect of Cooling Case 8>

In FIGS. 1 and 5, when water (cooling water) flows through the two cooling passages 17, the first metal portion 15 in the cooling portion 13 is cooled, and accordingly, the plurality of second metal portions 16 are also cooled. In the plurality of battery cells 5, a surface on the lower end 12 side and two large surfaces in the front-rear direction are cooled by the cooling portion 13. Needless to say, the cell accommodating portion 14 itself is also cooled by the cooling portion 13. As the water (cooling water) continues to flow, the temperature rise of the battery module 2 is suppressed, and the function is maintained.

<Effect of Battery Module 2 and Battery Pack 1>

As described above with reference to FIGS. 1 to 10, according to the battery module 2 which is an embodiment of the present invention, the sides on the lower ends 12 of the plurality of battery cells 5, the plurality of battery cells 5, and the plurality of the battery cells 5 on the side of the side wall 22 are cooled, so that the cooling range can be greatly expanded as compared with the conventional example.

Further, according to the battery module 2, since the first metal portion 15 and the plurality of second metal portions 16 are separately formed and the second metal portions 16 are inserted into the slits 19 of the first metal portion 15, the cooling portion 13 can be easily assembled. Further, according to the battery module 2, since the plurality of second metal portions 16 are made of metal thin plates, the interval between the adjacent battery cells 5 is maintained as in the conventional example, and as a result, an increase in size can be prevented. Further, according to the battery module 2, since the first metal portion 15 is a thicker metal plate than the second metal portion 16, the first metal portion 15 can be provided with the cooling ability when there are a plurality of second metal portions 16.

According to the battery module 2 as described above, the cooling effect can be improved. In other words, the cooling capacity of the battery cell 5 can be improved. In addition, according to the battery pack 1, since the battery module 2 having the above-described effects is provided, a better battery pack can be provided.

The invention can be variously modified without departing from the spirit of the invention.

What is claimed is:

1. A battery module comprising:
   a plurality of battery cells each having an electrode at one end,
   a cell accommodating portion made of resin and accommodating the plurality of battery cells, and
   a cooling portion for cooling the plurality of battery cells,
   wherein the cooling portion includes
   a first metal portion disposed on ends of the plurality of battery cells opposing the respective one ends and having an upper surface facing the ends of the plurality of battery cells opposing the respective one ends, and
   a plurality of second metal portions extending from the upper surface of the first metal portion to the one ends of the plurality of battery cells and disposed between the plurality of battery cells,
   wherein the cell accommodating portion includes
   a resin insert portion formed by insert molding at least the upper surface of the first metal portion and the plurality of second metal portions, and
   wherein the cell accommodating portion has a side wall that surrounds the first metal portion and the plurality of battery cells, and at least one of the second metal portions is contained inside the side wall.

2. The battery module according to claim 1,
   wherein the first metal portion is a thicker metal plate than the plurality of second metal portions, and
   the first metal portion has a plurality of slits into which the plurality of second metal portions are inserted.

3. The battery module according to claim 2,
   wherein the first metal portion includes a cooling passage for flowing cooling water or refrigerant.

4. A battery pack comprising:
   the battery module described in claim 3;
   a case accommodating the battery module, and
   a cover covering the case.

5. The battery module according to claim 1,
   wherein the plurality of battery cells has at least a first row of battery cells and a second row of battery cells, the first row and the second row extend in a front-rear direction, in which the front-rear direction is orthogonal to a height direction of the battery module, and
   one of the second metal portions is disposed between a pair of battery cells in the first row and between a pair of battery cells in the second row.

6. The battery module according to claim 1,
   wherein the first metal portion is a rectangular metal plate having a plurality of sides extending away from the upper surface, each of the sides has a stepped shape, and
   the resin insert portion covers the stepped shape of each of the sides.

* * * * *